United States Patent
Weems (10) Patent No.: US 11,085,658 B1
(45) Date of Patent: Aug. 10, 2021

(54) SYSTEMS AND METHODS FOR SENSOR-BASED VENTILATION

(71) Applicant: United Services Automobile Association (USAA), San Antonio, TX (US)

(72) Inventor: John Andrew Weems, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 123 days.

(21) Appl. No.: 16/002,323

(22) Filed: Jun. 7, 2018

Related U.S. Application Data (60) Provisional application No. 62/516,738, filed on Jun. 8, 2017.

(51) Int. Cl.
| | | |
|---|---|---|
| *F24F 11/00* | (2018.01) | |
| *G05B 19/042* | (2006.01) | |
| *F24F 7/007* | (2006.01) | |
| *F24F 7/00* | (2021.01) | |
| *F24F 110/20* | (2018.01) | |
| *F24F 120/10* | (2018.01) | |

(52) U.S. Cl.
CPC .......... *F24F 11/0001* (2013.01); *F24F 7/007* (2013.01); *G05B 19/0428* (2013.01); *F24F 2007/001* (2013.01); *F24F 2110/20* (2018.01); *F24F 2120/10* (2018.01); *G05B 2219/2614* (2013.01)

(58) Field of Classification Search
CPC .... F24F 11/0001; F24F 7/007; F24F 2120/10; F24F 2110/20; F24F 2007/001; G05B 19/0428; G05B 2219/2614
USPC ........................................................ 700/276
See application file for complete search history.

(56) References Cited

U.S. PATENT DOCUMENTS

| | | | | |
|---|---|---|---|---|
| 5,455,971 | A * | 10/1995 | Sakakibara | E03D 5/105 4/313 |
| 2005/0283891 | A1* | 12/2005 | Lim | E03D 5/105 4/300 |
| 2006/0037127 | A1* | 2/2006 | Chen | E03D 9/05 4/213 |
| 2007/0072541 | A1* | 3/2007 | Daniels, II | F24F 7/02 454/365 |
| 2010/0211224 | A1* | 8/2010 | Keeling | F24D 19/1066 700/277 |
| 2010/0235004 | A1* | 9/2010 | Thind | G05B 15/02 700/277 |
| 2011/0047689 | A1* | 3/2011 | Gianelloni | E03D 9/052 4/348 |

(Continued)

Primary Examiner — Jigneshkumar C Patel
(74) Attorney, Agent, or Firm — Fletcher Yoder, PC (57) ABSTRACT

A sensor-based ventilation system includes a sensor, a ventilation device, and a controller. The controller receives a first indication from the sensor related to toilet usage or a humidity level within a room. The controller also sends a first instruction to actuate the ventilation device to initiate or increase ventilation of the room based on the first indication. The controller further receives a second indication from the sensor related to the toilet usage or the humidity level within the room changing after sending the first instruction. controller sends a second instruction to actuate the ventilation device to stop or reduce ventilation of the room based on the second indication.

20 Claims, 4 Drawing Sheets

(56) References Cited

U.S. PATENT DOCUMENTS

2014/0131459 A1\* 5/2014 Dorendorf ............... F24F 11/77
                                                      236/49.3
2018/0014393 A1\* 1/2018 Cheung ................ H05B 47/105

\* cited by examiner

"SYSTEMS AND METHODS FOR
SENSOR-BASED VENTILATION"

CROSS-REFERENCE TO RELATED APPLICATIONS

This application claims benefit of U.S. Provisional Application Ser. No. 62/516,738, filed Jun. 8, 2017, entitled "Systems and Methods for Sensor-Based Ventilation," which is hereby incorporated by reference in its entirety for all purposes.

BACKGROUND

The present disclosure relates generally to ventilation, and more particularly to systems and methods for sensor-based ventilation.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Ventilation, the process of replacing air in a room or building, may typically be performed on a regular or periodic basis to meet code standards. For example, a code standard may include a ventilation rate, expressed by volumetric flowrate of outside air being introduced into a building in cubic feet per minute. In this manner, indoor air quality may be controlled to dilute or displace indoor pollutants, increase thermal comfort, and/or dehumidify indoor air. However, in certain cases, immediate ventilation may be desired. For example, when a person uses a toilet, the person may desire immediate ventilation to refresh the local air. As another example, when a person uses a shower, the person may desire immediate ventilation to dehumidify the bathroom. In such cases, the person may turn on an exhaust fan to immediately vent the area.

It is now recognized that it would be more convenient if a person did not have to actively turn on an immediate ventilation device (e.g., an exhaust fan) to ventilate the area. Moreover, it is now recognized that, in some cases, the person does not have the ability to actively turn on the immediate ventilation device, such as when the person is in a non-residential (e.g., commercial) building.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to ventilation, and more particularly to systems and methods for sensor-based ventilation. In some embodiments, a controller may determine that a person is using a toilet via an occupancy sensor. If the controller determines that the person has used the toilet for a threshold time (e.g., 30 seconds), then the controller may ventilate the room (e.g., by operating an exhaust fan, opening a vent, or any combination thereof). In other embodiments, a controller may determine humidity of a room via a humidity sensor. If the humidity of the room exceeds a threshold humidity (e.g., 70% of a nominal humidity), then the controller may ventilate the room. In this manner, the person does not have to actively turn on a ventilation device (e.g., an exhaust fan) to ventilate the area. Moreover, immediate ventilation may occur even in situations where the person does not have the ability to actively turn on a ventilation device, such as when the person is in a non-residential (e.g., commercial) building.

Figure 1:
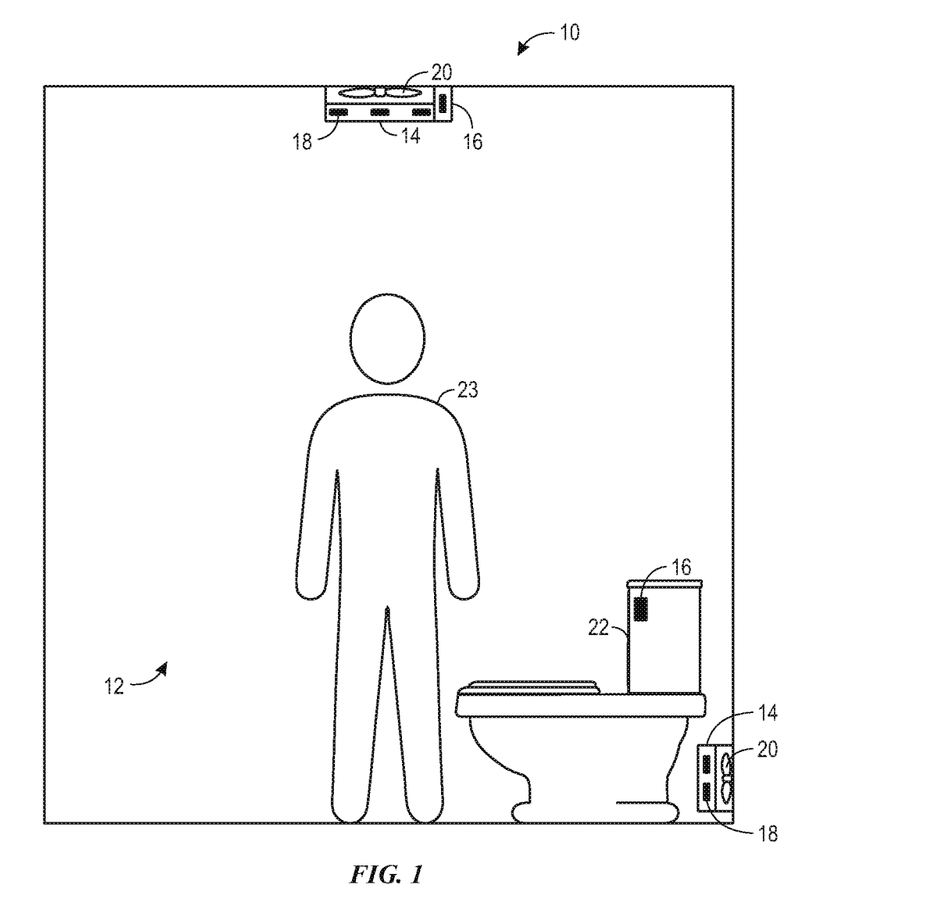
FIG. 1 is a side view of an occupancy sensor-based ventilation system in a restroom, according to an embodiment of the present disclosure.

As an introduction, FIG. 1 is a perspective view of an occupancy sensor-based ventilation system 10 in a restroom 12, according to an embodiment of the present disclosure. As illustrated, the sensor-based ventilation system 10 includes a ventilation device 14 and a sensor 16. For example, the ventilation device 14 may include one or more controllable vents 18, one or more controllable fans 20, and the like. The ventilation device 14 may be located in any suitable location of a room or building. For example, FIG. 1 shows a ceiling ventilation device 14 located on the ceiling (e.g., a ceiling vent and/or fan). FIG. 1 also shows an alternative or additional floor ventilation device 14 located near the floor. In some circumstances, it may be more effective to locate the ventilation device 14 near the source of air to be replaced (e.g., near a toilet 22).

The sensor 16 may detect whether a person 23 is occupying at least a portion of a room or building, or is using a device or facility in the room or building. In some embodiments, the sensor 16 may be a motion detection sensor, seat engagement sensor, shape recognition sensor, light (or lack of light) detection sensor, and/or the like, related to toilet usage. For example, the sensor 16 may be a pressure sensor that detects when a person is sitting on the toilet 22. As another example, the sensor 16 may be a motion detection, shape recognition, and/or light detection sensor that detects when a person is in a restroom, near a toilet, in a stall of a restroom, or the like. In some embodiments, the sensor 16 may be a part of the ventilation device 14 or mounted to or next to the ventilation device 14. For example, the ceiling ventilation device 14 may include the sensor 16, which may detect when a person is in the restroom 12 or using the toilet 22. In alternative or additional embodiments, the sensor 16 may be remotely located from the ventilation device 14. For example, the toilet 22 may include a sensor 16 that detects whether a person is using the toilet 22. In the illustrated embodiment, the sensor 16 detects that the person 23 is present. The sensor 16 may, for example, be a typical sensor for use in automatically flushing the toilet 22 when the person 23 moves away from the sensor 16.

Figure 2:
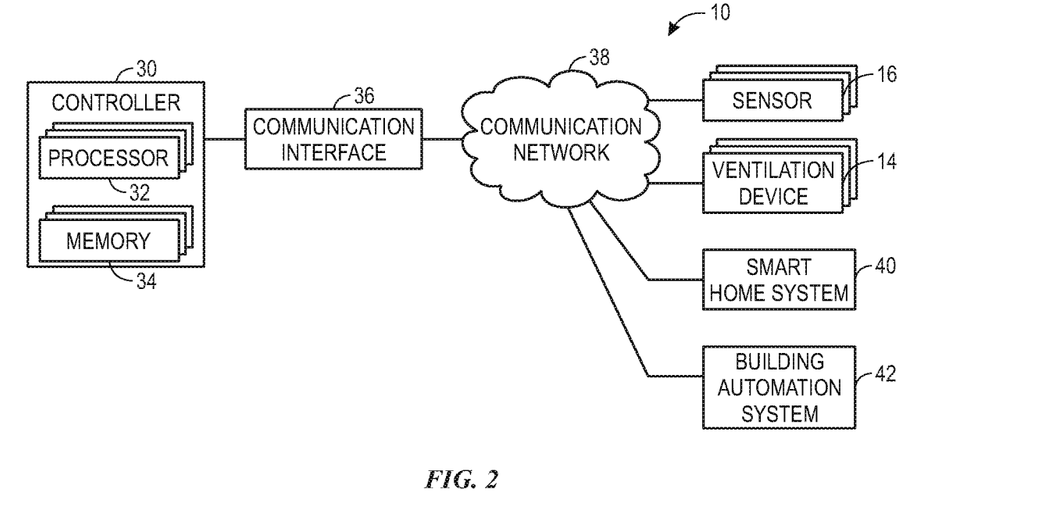
FIG. 2 is a block diagram of the sensor-based ventilation system of FIG. 1, according to an embodiment of the present disclosure.

With this in mind, FIG. 2 is a block diagram of the sensor-based ventilation system 10 of FIG. 1, according to an embodiment of the present disclosure. The sensor-based ventilation system 10 may include a controller 30. The controller 30 may include a processor 32 and a memory 34. It should be noted that the processor 32 and the memory 34 may each represent or include multiple processors and multiple memories, respectively. The processor 32 (e.g., microprocessors) may execute software programs and/or instructions to receive an indication that a person is in a room or building or using a device or facility in the room or building from the sensor 16 and control operation of the ventilation device 14. Moreover, the processor 32 may include multiple microprocessors, one or more "general-purpose" microprocessors, one or more special-purpose microprocessors, and/or one or more application specific integrated circuits (ASICS), or some combination thereof. For example, the processors 32 may include one or more reduced instruction set (RISC) processors. The memory 34 may store information such as control software, look up tables, configuration data, etc. In some embodiments, the processor 32 and/or the memory 34 may be external to the controller 30. The memory 34 may include a tangible, non-transitory, machine-readable-medium, such as a volatile memory (e.g., a random access memory (RAM)) and/or a nonvolatile memory (e.g., a read-only memory (ROM)). The memory 34 may store a variety of information and may be used for various purposes. For example, the memory 34 may store machine-readable and/or processor-executable instructions (e.g., firmware or software) for the processor 32 to execute, such as instructions for receiving an indication that a person is in a room or building or using a device or facility in the room or building from the sensor 16 and controlling operation of the ventilation device 14. The memory 34 may include one or more storage devices (e.g., nonvolatile storage devices) that may include read-only memory (ROM), flash memory, a hard drive, or any other suitable optical, magnetic, or solid-state storage medium, or a combination thereof. In alternative or additional embodiments, the controller 30 may include any suitable component, such as general purpose relays, industrial relays, solid-state relays, solenoid switches, and the like.

The controller 30 may be communicatively coupled to a communication interface 36. The communication interface 36 may enable the controller 30 to communicate with any suitable communication network 38. For example, the communication interface 36 may enable the controller 30 to communicate with wireless networks (e.g., mobile, WiFi, LAN, WAN, Internet, and the like). In this manner, the communication interface 36 may enable the controller 30 to communicate with, for example, one or more sensors 16 and/or one or more ventilation devices 14 communicatively coupled to the communication network 38. For example, the controller 30 may use the communication interface 36 to receive an indication that a person is in a room or building or using a device or facility in the room or building from the sensor 16. The communication interface 36 may directly interact with the sensor 16 (e.g., via direct signaling) or via secondary indicia (e.g., flashing lights indicative of operation). Such indirect interaction may facilitate operation with legacy sensors 16 (e.g., standard flush activation sensors). For example, the sensor 16 may be operable to detect a signal and/or a flashing light emitted by an automatic flushing device on the toilet 22 that indicates a flush activation or related activity. In various embodiments, the indication from the sensor 16 may be related to motion detection, seat engagement, shape recognition, light (or lack of light) detection, and/or the like, based on the person from an automatic toilet flusher.

The controller 30 may use the communication interface 36 to control operation of the ventilation device 14. In some embodiments, the system 10 may not include the communication interface 36, as the controller 30 may be directly connected to the sensor 16 and the ventilation device 14.

In some embodiments, the controller 30 may be part of a home automation or smart home system. For example, the controller 30 may control and/or automate lighting, heating, ventilation, air conditioning, security, home appliances (e.g., washers, dryers, ovens, refrigerators, and freezers), and the like, of a home, via a communication network (such as the communication network 38). In alternative or additional embodiments, the controller 30 may communicate with the smart home system 40 via the communication interface 36.

In additional or alternative embodiments, the controller 30 may be part of a building automation system (e.g., of a commercial building). For example, the controller 30 may control and/or automate lighting, heating, ventilation, air conditioning, and the like, of a building. In alternative or additional embodiments, the controller 30 may communicate with the building automation system 42 via the communication interface 36.

Figure 3:
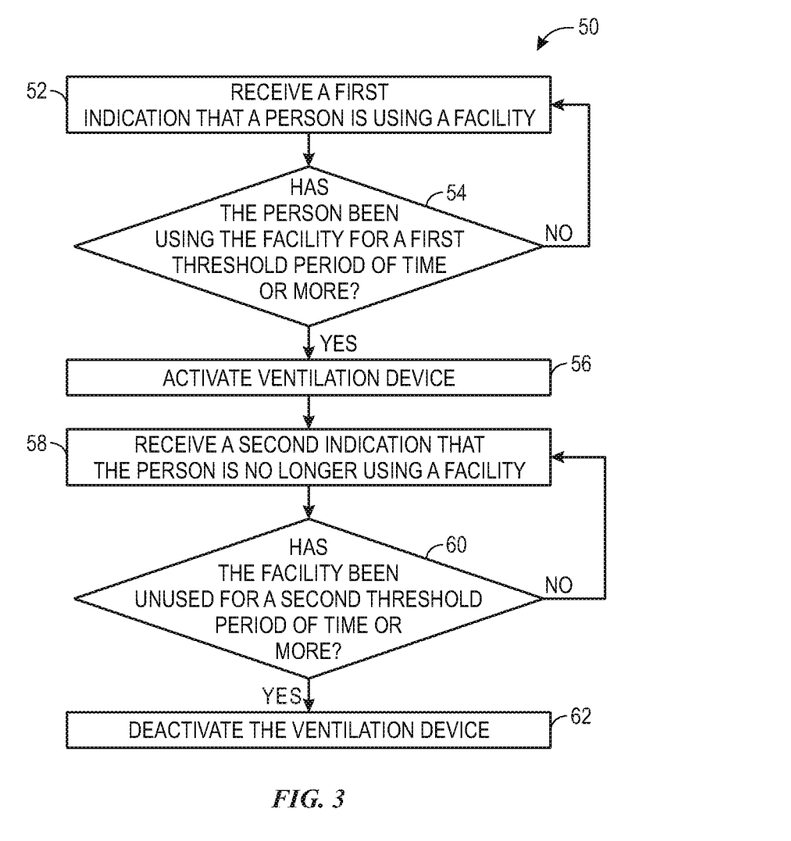
FIG. 3 is a flowchart illustrating a method for occupancy sensor-based ventilation using the system of FIGS. 1 and 2, according to an embodiment of the present disclosure.

FIG. 3 is a flowchart illustrating a method 50 for sensor-based ventilation using the system 10 of FIGS. 1 and 2, according to an embodiment of the present disclosure. The method 50 may be performed using any suitable device, such as the controller 30, that may receive an indication that a person is in a room or building or using a device or facility in the room or building from the sensor 16 and control operation of the ventilation device 14. While the method 50 is described as including steps in a specific sequence, it should be understood that the present disclosure contemplates that the described steps may be performed in different sequences than the sequence illustrated, and certain described steps may be skipped or not performed altogether. In some embodiments, the method 50 may be implemented by executing instructions stored in a tangible, non-transitory, computer-readable medium, such as the memory 34, using a processor, such as the processor 32.

As illustrated, the controller 30 receives (process block 52) a first indication that a person is using a facility (e.g., the toilet 22). The first indication may be received from the sensor 16. In alternative or additional embodiments, the first indication may indicate that the person is in a room or building or using any other suitable device or facility in the room or building.

The controller 30 then determines (decision block 54) whether the person has been using the facility (e.g., the toilet 22) for a first threshold period of time or time value, or more. For example, the first threshold period of time may be within a range of 5 to 120 seconds (e.g., 30 seconds), though any suitable period of time that indicates a desired level of usage to merit venting or a venting-related action is contemplated.

If the controller 30 determines that the person has been using the facility for the first threshold period of time or more, then the controller 30 (process block 56) activates or sends an instruction to activate the ventilation device 14. In some embodiments, the controller 30 may determine that the person has been using the facility for the first threshold period of time or more by determining that the first indication remains active for the first threshold period of time or more. For example, if the ventilation device 14 includes controllable vents 18, the controller 30 may open (in whole or in part) the controllable vents 18 such that the air to be replaced is pulled from the facility or surroundings (e.g., restroom 12). As another example, if the ventilation device 14 includes a controllable fan 20, the controller 30 may turn on or increase speed of the controllable fan 20 to pull the air to be replaced from the facility or surroundings. If the controller 30 does not determine that the person has been using the facility for the first threshold period of time or more, the controller 30 returns to process block 52. It should be understood that activating the ventilation device 14 may refer to any suitable operation that causes the ventilation device 14 to vent or increase venting of air from the facility, such as actuating the ventilation device 14, operating the ventilation device 14, and the like.

In some embodiments, the ventilation device 14 may include the controllable fan 20 operable based on a pressure differential. In such embodiments, the sensor 16 may include a pressure differential sensor that detects differential pressure in, for example, the facility or surroundings, and the controller 30 may be coupled to the pressure differential sensor. As such, the controller 30 may activate the controllable fan 20 and control the controllable fan 20 to pull the air to be replaced from the facility or surroundings while maintaining a range of differential pressure in the facility or surroundings.

In embodiments where the controller 30 is connected to the building automation system 42, the building automation system 42 may include both controllable vents 18 and controllable fans 20, wherein the controllable fans 20 may operate based on an occupancy schedule of the building. As such, the controller 30 may actuate the controllable vents 18 (e.g., at least partially open the controllable vents 18 or further open the controllable vents 18) such that the air to be replaced is pulled from the facility or surroundings (e.g., the restroom 12). In additional or alternative embodiments, the controller 30 may both actuate the controllable vents 18 and activate, turn on, or increase speed of the controllable fans 20 to pull the air to be replaced from the facility or surroundings. In such embodiments, the controller 30 may also maintain pressure in an exhaust duct (e.g., by controlling speeds of the controllable fans 20). In one embodiment, the controller 30 may receive an indication associated with vent positions and/or fan speeds of the building automation system 42 and activate the ventilation device 14 based on this indication. For example, when the building automation system 42 is in an economizer mode, such that all controllable vents 18 of the building automation system 42 are open, the controller 30 may not send an instruction to activate a ventilation device 14 because all controllable vents 18 are already open. Moreover, the building automation system 42 and/or the controller 30 may at least partially open the controllable vents 18 and/or activate, turn on, or increase speed of the controllable fans 20 based on weather conditions or building pressurization information. The weather conditions or building pressurization information may be received by the building automation system 42 and/or the controller 30 via one or more sensors that measure data related to the weather conditions or building pressurization information and that are communicatively coupled to the building automation system 42 and/or the controller 30.

The controller 30 also receives (process block 58) a second indication that the person is no longer using the facility. The second indication may also be received from the sensor 16. In alternative or additional embodiments, the second indication may indicate that the person is no longer in a room or building or no longer using any other suitable device or facility in the room or building. For example, the second indication may include a ceasing of a signal corresponding to the first indication, thus indicating that the person is no longer using the facility.

The controller 30 then determines (decision block 60) whether the facility (e.g., the toilet 22) has been unused for a second threshold period of time or time value, or more. For example, the second threshold period of time may be within a range of 2 to 15 minutes (e.g., 5 minutes), though any suitable period of time that indicates that the air has been sufficiently replaced is contemplated.

If the controller 30 determines that the facility has been unused for a second threshold period of time or more, then the controller 30 (process block 62) deactivates or sends an instruction to deactivate the ventilation device 14. In some embodiments, the controller 30 may determine that the facility has been unused for a second threshold period of time or more by determining that the second indication remains active for the second threshold period of time or more. For example, if the ventilation device 14 includes controllable vents 18, the controller 30 may close (in whole or in part) the controllable vents 18 such that the air is no longer pulled from the facility or surroundings. As another example, if the ventilation device 14 includes a controllable fan 20, the controller 30 may turn off or decrease speed of the controllable fan 20 to stop pulling air from the facility or surroundings (e.g., the restroom 12). If the controller 30 does not determine that the facility has been unused for a second threshold period of time or more, the controller 30 returns to process block 58. It should be understood that deactivating the ventilation device 14 may refer to any suitable operation that causes the ventilation device 14 to stop venting or reduce venting air from the facility, such as actuating the ventilation device 14, operating the ventilation device 14, and the like.

In embodiments where the ventilation device 14 includes the controllable fan 20 operable based on a pressure differential, the controller 30 may deactivate or control the controllable fan 20 to stop or decrease pulling the air to be replaced from the facility or surroundings while maintaining a range of differential pressure therein.

In embodiments where the controller 30 is connected to the building automation system 42, the controller 30 may at least partially close the controllable vents 18 such that the air is no longer being pulled from the facility or surroundings. In additional or alternative embodiments, the controller 30 may both close the controllable vents 18 and deactivate or control the controllable fans 20 to stop or decrease pulling the air from the facility or surroundings. In such embodiments, the controller 30 may also maintain pressure in an exhaust duct (e.g., by controlling speeds of the controllable fans 20). In one embodiment, the controller 30 may receive an indication associated with vent positions and/or fan speeds of the building automation system 42 and deactivate the ventilation device 14 based on this indication. For example, when the building automation system 42 is in an economizer mode, such that all controllable vents 18 of the building automation system 42 are open, the controller 30 may not send an instruction to deactivate the ventilation device 14 because all controllable vents 18 should be open in the economizer mode. Moreover, the building automation system 42 and/or the controller 30 may open the controllable vents 18 and/or activate and turn on the controllable fans 20 based on weather conditions or building pressurization information. The weather conditions or building pressurization information may be received by the building automation system 42 and/or the controller 30 via one or more sensors that measure data related to the weather conditions or building pressurization information and are communicatively coupled to the building automation system 42 and/or the controller 30.

In this manner, the person using the facility (e.g., the toilet 22) does not have to actively turn on the ventilation device 14 to ventilate the area. Moreover, in cases where the person does not have the ability to actively turn on the ventilation device 14, such as when the controller 30 is connected to the building automation system 42, the controller 30 may turn on the ventilation device 14 to ventilate the area.

In embodiments where the controller 30 is connected to the smart home system 40, after any or each step of the method 50, the controller 30 may send a notification to the smart home system 40 indicating that the step has been performed and/or results of the step. For example, after receiving (process block 52) the first indication that the person is using the facility, the controller 30 may send a notification to the smart home system 40 that the person is using the facility. Moreover, the weather conditions or building pressurization information may be received by the smart home system 40 and/or the controller 30 via one or more sensors that measure data related to the weather conditions or building pressurization information and are communicatively coupled to the smart home system 40 and/or the controller 30.

Figure 4:
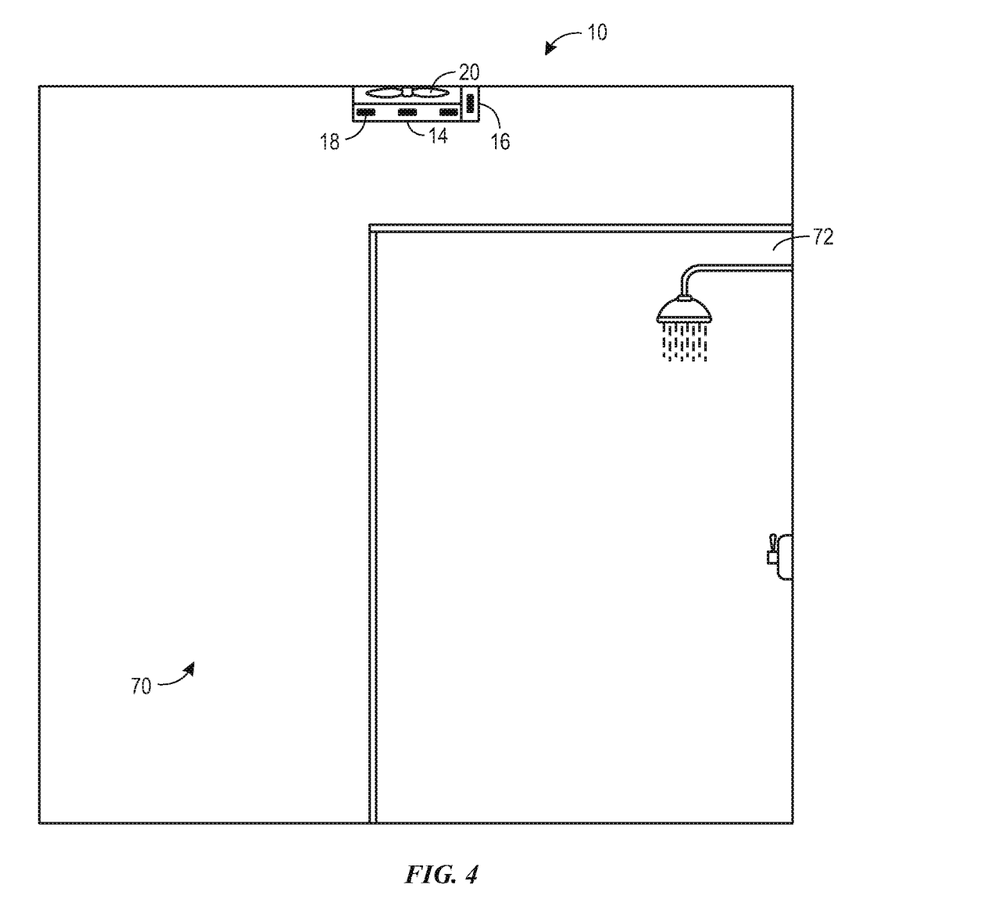
FIG. 4 is a side view of a humidity sensor-based ventilation system in a bathroom, according to an embodiment of the present disclosure.

FIG. 4 is a side view of a humidity sensor-based ventilation system 10 in a bathroom 70, according to an embodiment of the present disclosure. The sensor 16 may include a humidity sensor that may detect the humidity in the bathroom 70. In some embodiments, the sensor 16 may be a part of the ventilation device 14 or mounted to or next to the ventilation device 14. For example, the ceiling ventilation device 14 may include the humidity sensor 16. In alternative or additional embodiments, the sensor 16 may be remotely located from the ventilation device 14. The bathroom 70 includes a shower 72, which, when turned on to provide hot water, increases the humidity in the bathroom 70. While FIG. 4 shows the sensor-based ventilation system 10 in the bathroom 70, the sensor-based ventilation system 10 may be used in any suitable room where humidity may change by using a device or facility in the room, such as a laundry room, sauna, mud room, kitchen (e.g., due to boiling water), and the like.

Figure 5:
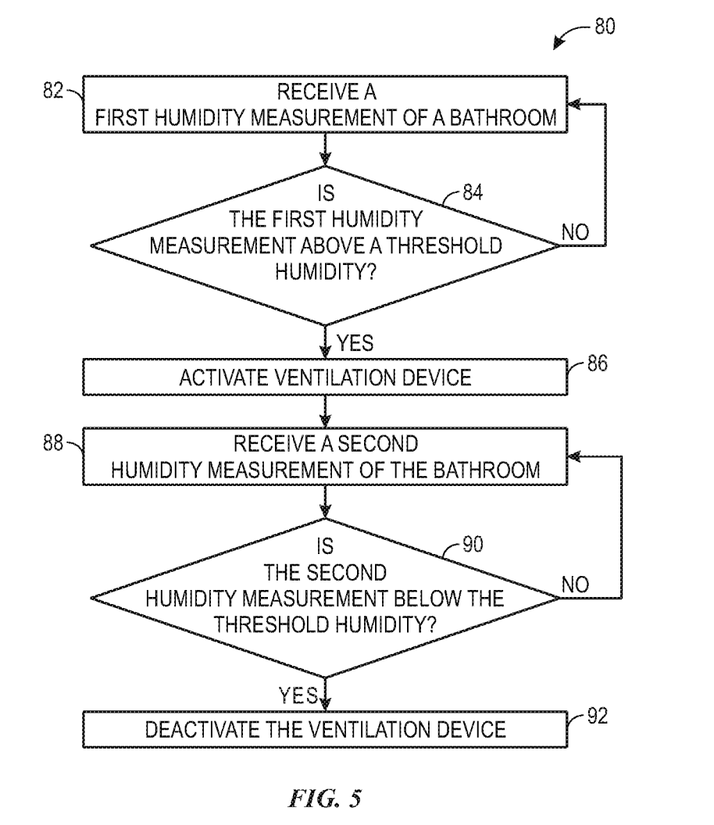
FIG. 5 is a flowchart illustrating a method for humidity sensor-based ventilation using the system of FIGS. 2 and 4.

FIG. 5 is a flowchart illustrating a method 80 for sensor-based ventilation using the system 10 of FIGS. 2 and 4, according to an embodiment of the present disclosure. The method 80 may be performed by any suitable device that may receive a humidity measurement in a room or building from the sensor 16 and control operation of the ventilation device 14, such as the controller 30. While the method 80 is described using steps in a specific sequence, it should be understood that the present disclosure contemplates that the described steps may be performed in different sequences than the sequence illustrated, and certain described steps may be skipped or not performed altogether. In some embodiments, the method 80 may be implemented by executing instructions stored in a tangible, non-transitory, computer-readable medium, such as the memory 34, using a processor, such as the processor 32.

As illustrated, the controller 30 receives (process block 82) a first humidity measurement of the bathroom 70. The first humidity measurement may be received from the sensor 16. The first humidity measurement may be expressed as absolute humidity (e.g., water content of air in grams per cubic meter), relative humidity (e.g., expressed as a percent of current absolute humidity relative to a maximum for the current temperature), or specific humidity (e.g., a ratio of the mass of water vapor to the total mass of a moist air parcel).

The controller 30 then determines (decision block 84) whether the first humidity measurement is above a threshold humidity. As with the first humidity measurement, the threshold humidity may be expressed as absolute humidity, relative humidity, or specific humidity. For example, the threshold humidity may be within a range of 50 to 100% (e.g., 70%) relative humidity.

If the controller 30 determines that the first humidity measurement is above the threshold humidity, then the controller 30 (process block 86) activates or sends an instruction to activate the ventilation device 14. This may be preceded by a sensor-based determination that replacement air is less humid than the air to be expelled. Requiring this may prevent continuous looping by the controller 30. If the controller 30 does not determine that the first humidity measurement is above the threshold humidity, the controller 30 returns to process block 82.

The controller 30 also receives (process block 88) a second humidity measurement of the bathroom 70. The second humidity measurement may also be received from the sensor 16, and may also be expressed as absolute humidity, relative humidity, or specific humidity.

The controller 30 then determines (decision block 90) whether the second humidity measurement is below the threshold humidity.

If the controller 30 determines that the second humidity measurement is below the threshold humidity, then the controller 30 (process block 92) deactivates or sends an instruction to deactivate the ventilation device 14. For example, if the ventilation device 14 includes controllable vents 18, the controller 30 may at least partially close the controllable vents 18 such that the air is no longer pulled from the bathroom 70. As another example, if the ventilation device 14 includes a controllable fan 20, the controller 30 may turn off or decrease speed of the controllable fan 20 to stop pulling air from the bathroom 70. If the controller 30 does not determine that the second humidity measurement is below the threshold humidity, the controller 30 returns to process block 88. In this manner, the person using the shower 72 does not have to actively turn off the ventilation device 14 to ventilate the area.

In embodiments where the controller 30 is connected to the smart home system 40, after any or each step of the method 80, the controller 30 may send a notification to the smart home system 40 indicating that the step has been performed and/or results of the step. For example, after receiving (process block 82) the first humidity measurement of the bathroom 70, the controller 30 may send a notification to the smart home system 40 associated with the first humidity measurement.

While the method 80 is described as performed in the bathroom 70 and is associated with increased humidity resulting from operating a shower 72, it should be understood that the method 80 may be performed in any suitable room where humidity may change by using a device or facility in the room, such as a laundry room, sauna, mud room, and the like. For example, the method 80 may be performed in a laundry room where humidity may change by using a washer or dryer in the laundry room.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A sensor-based ventilation system comprising:
    a sensor configured to sense a toilet usage based on motion detection, seat engagement, shape recognition, light detection from an automatic flushing device, or any combination thereof;
    one or more controllable vents coupled to a wall or a ceiling of a bathroom; and
    a controller communicatively coupled to the sensor and the one or more controllable vents, wherein the controller is configured to:
        receive a first indication from the sensor related to the toilet usage within the bathroom;
        maintain a current operating condition of the one or more controllable vents in response to the first indication remaining active for less than a first threshold time;
        send a first instruction to activate the one or more controllable vents to initiate or increase ventilation of the bathroom in response to the first indication remaining active for at least the first threshold time;
        receive a second indication from the sensor related to ceasing the toilet usage after sending the first instruction; and
        send a second instruction to deactivate the one or more controllable vents to stop or reduce ventilation of the bathroom in response to the second indication remaining active for a second threshold time.

2. The sensor-based ventilation system of claim 1, wherein the sensor is an occupancy sensor configured to detect that a person is sitting on a toilet to indicate the toilet usage.

3. The sensor-based ventilation system of claim 2, wherein the toilet comprises the occupancy sensor and wherein the controller is configured to instruct the automatic flushing device to automatically flush the toilet in response to receiving the second indication from the sensor related to ceasing the toilet usage.

4. The sensor-based ventilation system of claim 1, wherein the sensor is configured to indirectly detect the toilet usage based at least in part on monitoring a light emitted by the automatic flushing device, wherein the automatic flushing device is coupled to a toilet, and wherein the sensor is coupled to the wall or the ceiling of the bathroom.

5. The sensor-based ventilation system of claim 1, comprising a controllable fan, wherein the first instruction is configured to activate the controllable fan to initiate or increase ventilation of the bathroom based at least in part on the first indication, wherein the second instruction is configured to deactivate the controllable fan to stop or reduce ventilation of the bathroom based at least in part on the second indication.

6. The sensor-based ventilation system of claim 1, comprising a communication interface communicatively coupled to the sensor, the one or more controllable vents, and the controller, wherein the controller is configured to receive the first indication, send the first instruction, receive the second indication, and send the second instruction via the communication interface.

7. The sensor-based ventilation system of claim 1, comprising a smart home system or a building automation system communicatively coupled to the controller, wherein the smart home system or the building automation system is configured to activate the one or more controllable vents based at least in part on weather conditions or building pressurization information.

8. The sensor-based ventilation system of claim 1, wherein the threshold time comprises between 2 and 15 minutes.

9. The sensor-based ventilation system of claim 1, wherein the controller is configured to:
    determine that the one or more controllable vents are not already activated to initiate or increase ventilation of the bathroom; and
    send the first instruction to activate the one or more controllable vents to initiate or increase ventilation of the bathroom in response to determining that the one or more controllable vents are not already activated to initiate or increase ventilation of the bathroom.

10. The sensor-based ventilation system of claim 1, wherein the one or more controllable vents are coupled to the wall of the bathroom near a toilet.

11. A controller communicatively coupled to an occupancy sensor coupled to a toilet disposed within a bathroom of a building, a ventilation device, and a smart home system, wherein the controller is configured to:
    receive a first indication from the occupancy sensor related to using the toilet, the first indication corresponding to motion or light detection from an automatic flushing device;
    send a first instruction to activate the ventilation device to initiate or increase venting from the bathroom in response to the first indication from the occupancy sensor remaining active for a threshold time, wherein the ventilation device is coupled to a wall or a ceiling of the bathroom;
    receive a second indication from the occupancy sensor related to no longer using the toilet after sending the first instruction;
    send a second instruction to instruct the automatic flushing device to flush the toilet in response to receiving the second indication;
    receive a third indication corresponding to a differential pressure of the building from the smart home system after sending the first instruction, wherein the differential pressure is received from a pressure differential sensor disposed in the building and communicatively coupled to the smart home system; and send a third instruction to deactivate the ventilation device to stop or reduce venting from the bathroom based at least in part on receiving the third indication.

12. The controller of claim 11, wherein the controller is configured to send the first instruction based at least in part on a time elapsed after initially receiving the first indication exceeding a threshold value.

13. The controller of claim 12, wherein the threshold value comprises between 5 and 120 seconds.

14. The controller of claim 11, wherein the ventilation device comprises a controllable vent, a controllable fan, or both.

15. The controller of claim 11, wherein the controller is configured to maintain a current operating condition of the ventilation device in response to the first indication remaining active for less than the threshold time.

16. A method for sensor-based ventilation comprising:
receiving, via at least one processor, a first indication from a sensor related to a toilet usage within a bathroom, wherein the sensor is configured to sense the toilet usage based on motion detection, seat engagement, shape recognition, light detection from an automatic flushing device, or any combination thereof;
maintaining, via the at least one processor, a current operating condition of one or more controllable vents coupled to a wall or a ceiling of the bathroom in response to the first indication remaining active for less than a first threshold time;
sending, via the at least one processor, a first instruction to activate the one or more controllable vents to initiate or increase ventilation of the bathroom in response to the first indication remaining active for at least the first threshold time;
receiving, via the at least one processor, a second indication from the sensor related to ceasing the toilet usage after sending the first instruction; and
sending, via the at least one processor, a second instruction to deactivate the one or more controllable vents to stop or reduce ventilation of the bathroom in response to the second indication remaining active for a second threshold time.

17. The method of claim 16, wherein the sensor is an occupancy sensor configured to detect that a person is sitting on a toilet to indicate the toilet usage.

18. The method of claim 17, comprising instructing, via the at least one processor, the automatic flushing device to automatically flush the toilet in response to receiving the second indication from the sensor related to ceasing the toilet usage.

19. The method of claim 16, comprising activating, via the at least one processor, the one or more controllable vents based at least in part on weather conditions or building pressurization information received from a smart home system or a building automation system.

20. The method of claim 16, wherein the one or more controllable vents are coupled to the wall of the bathroom near a toilet.

\* \* \* \* \*